(12) United States Patent
Perkins et al.

(10) Patent No.: US 8,259,703 B2
(45) Date of Patent: *Sep. 4, 2012

(54) COMMUNICATION NETWORK WITH SKEW DETERMINATION

(75) Inventors: Drew D. Perkins, Saratoga, CA (US); David F. Welch, Alberta, CA (US); Ting-Kuang Chiang, Saratoga, CA (US); Edward E. Sprague, Woodside, CA (US); Parthiban Kandappan, San Jose, CA (US); Steven G. Grubb, Reisterstown, CA (US); Prasad Paranjape, Fremont, CA (US); Biao Lu, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 1235 days.

This patent is subject to a terminal disclaimer.

(21) Appl. No.: 11/856,692

(22) Filed: Sep. 17, 2007

(65) Prior Publication Data

US 2008/0175589 A1  Jul. 24, 2008

Related U.S. Application Data

(60) Provisional application No. 60/885,832, filed on Jan. 19, 2007.

(51) Int. Cl.
*H04L 12/28* (2006.01)
(52) U.S. Cl. ......................................... 370/351; 370/473
(58) Field of Classification Search .................. 370/248, 370/252, 351, 238, 237, 395.31, 395.3, 395.62
See application file for complete search history.

(56) References Cited

U.S. PATENT DOCUMENTS

| 7,149,432 B1* | 12/2006 | Smith et al. ..................... 398/158 |
| 7,751,713 B2* | 7/2010 | Perkins et al. ................... 398/81 |
| 2005/0039094 A1* | 2/2005 | Yan ................................. 714/726 |
| 2005/0286565 A1* | 12/2005 | Vakil et al. ..................... 370/503 |

* cited by examiner

*Primary Examiner* — Brenda H Pham
(74) *Attorney, Agent, or Firm* — North Weber & Baugh LLP; David L. Soltz

(57) ABSTRACT

Embodiments of the present invention determine skew relative to a plurality of communication paths on a network system. The network is a wavelength division multiplexed optical transport network. The plurality of communication paths involves different signal and path attributes such as a plurality of carrier wavelengths, optical carrier groups, physical communication paths (different nodes, different fibers along a same path, or any combination of the foregoing), or any other differentiating factors between two paths.

6 Claims, 11 Drawing Sheets

COMMUNICATION NETWORK WITH SKEW DETERMINATION

CROSS REFERENCE TO RELATED PATENT APPLICATIONS

This application is related to U.S. Provisional Application Ser. No. 60/885,832, entitled "Communication Network with Skew Path Factoring," filed Jan. 19, 2007 and to U.S. application Ser. No. 11/781,912, filed on Jul. 23, 2007 entitled "Communication Network with Skew Path Monitoring and Adjustment," both of which are incorporated herein by reference in their entirety.

BACKGROUND

A. Technical Field

This invention relates generally to optical transport networks, and more particularly to the determination of skew across a wave division multiplexed network.

B. Background of the Invention

Optical networks are able to communicate information at high data rates. An optical transport system 10 is shown in FIG. 1, with multiple intermediate nodes and routes 16 between source 12 and destination 14. Nodes n1-n6 in a network are provided as an exemplary network with spatial diversity in the span, or segments separating nodes, e.g., across a geographic area. Multiple communication paths between a source node and destination node are provided across the network. The transport system might consider the route length, the traffic load, the route cost, and latency property, among other factors, for a given signal when choosing a path within the network on which to transport the signal. For example, a high quality of service ("QoS") request might require a given signal be transported on a route between a source and a destination with the lowest amount of latency. Alternatively, as traffic data rates continue to mushroom, carriers typically resort to routing signals on alternative and/or relatively higher latency paths, which often times span a longer overall distance than the preferred path. Additionally, these longer paths typically have more nodes, which usually translate into compromised timing properties for the signal at the receiver.

SUMMARY OF THE INVENTION

Embodiments of the present invention determine skew characteristics of communication paths over a network. In certain embodiments, the skew characteristics can be measured using a synchronization marker. Timing properties of a signal path can be determined and compared to another path by determining the time difference before synchronization markers.

In some embodiments, the skew can be determined a priori by prediction. Predicted skew can be based on measured or theoretical latency information associated with a plurality of communication paths. The latency information can be stored and compared to the latency information of another communication path to predict the skew relative to the two paths. In some embodiments, latency information is stored and maintained in a look-up table. The latency information can be used to estimate the skew between two network paths.

In some embodiments skew can be determined empirically by measuring skew or latency information. A synchronization marker can be used to synchronize a plurality of paths. The time difference between two paths can be determined using the synchronization marker. In other embodiments a combination of a priori and empirical skew determination can be employed.

In one embodiment the skew can be used to route a signal as signal portions on the network. In certain embodiments of the invention, communication paths are selected relative to an analysis of skew on one or more of the selected communication paths and corresponding wavelengths. The associated information is routed on a path or paths with a minimum skew so that the sequential arrival of the information at a receiver is improved. Accordingly, the transmission of the associated information on the communication path(s) is controlled so that reassembly of the information becomes more efficient due to the relative arrival of portions of the information from a network to the receiver. The transmission of the associated information may be done as a virtual super wavelength or as a plurality of super wavelength groups.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for the purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, reformatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 2:
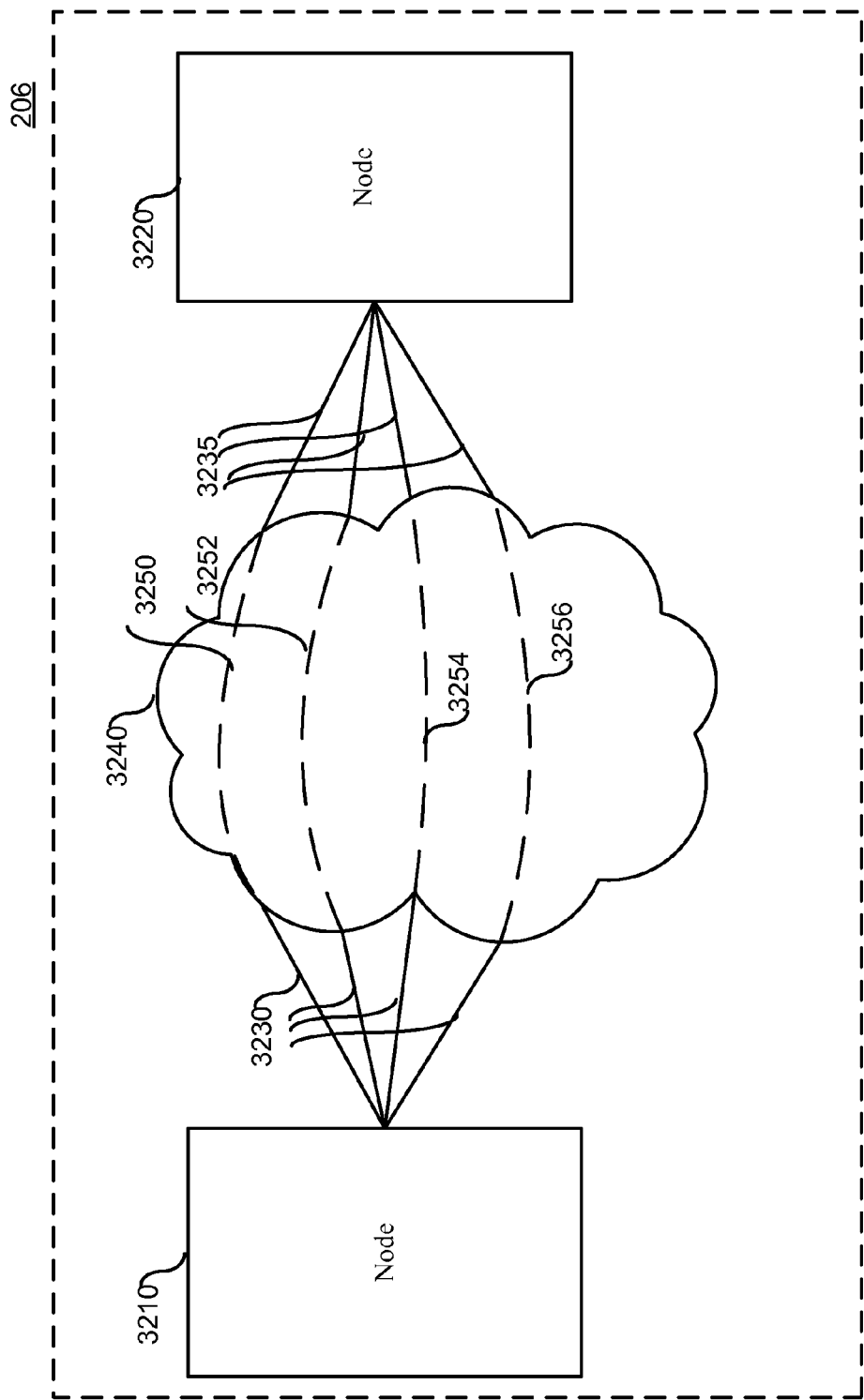
FIG. 2 is a block diagram of a communication network that transmits a signal over multiple channels considering skew information for routing the multiple channels, in accordance with various aspects of the present invention.

FIG. 2 illustrates a portion of an exemplary networking system where communication bandwidth and Quality of Service ("QoS") can be increased by transporting information, such as a client signal, over multiple communication paths within the network system. Information is any data, such as content, control, overhead, metadata, redundant or protection data, correction data, etc. that is transported along a path in the network.

The portion of the networking system shown in FIG. 2 can, in various embodiments, incorporate portions of legacy communication networks along with additional control, methods and/or apparatus to enable the measurement, control, and/or adjustment of skew on the communication network as described in the present disclosure. A node in the networking system can be any node where transmitted information is managed, processed and/or signal performance is evaluated via measurement devices.

In accordance with certain embodiments of the invention, nodes can be traditional analog nodes, digital nodes, hybrid nodes that allow signal management, or any combination thereof. Analog nodes may be amplifiers, or regeneration nodes. Nodes can also be digital nodes, implementing an optical to electrical to optical translation ("OEO") such as described in case as disclosed and taught in U.S. patent application Ser. No. 10/267,331, filed Oct. 8, 2003, entitled "TRANSMITTER PHOTONIC INTEGRATED CIRCUITS (TxPIC) AND OPTICAL TRANSPORT NETWORKS EMPLOYING TxPICs" and in U.S. patent application Ser. No. 10/267,212, filed Oct, 8, 2002, entitled "DIGITAL OPTICAL NETWORK ('DON') ARCHITECTURE", and U.S. Pat. No. 7,116,851, issued Oct. 3, 2006, entitled "AN OPTICAL SIGNAL RECEIVER PHOTONIC INTEGRATED CIRCUIT (RxPIC), AN ASSOCIATED OPTICAL SIGNAL TRANSMITTER PHOTONIC INTEGRATED CIRCUIT (TxPIC) AND AN OPTICAL TRANSPORT NETWORK UTILIZING THESE CIRCUITS", all of which patent applications and patents are incorporated herein by reference. Reference to measuring signal performance can be implemented in either the electrical or optical domain.

Information can be transported as a signal or signals. FIG. 2 shows one example of communication between node 3210 and node 3220. Network 3240 represents any intermediary networking system, including but not limited to, fiber, intermediary nodes or intermediary networking systems between nodes 3210 and 3220.

Referring to FIG. 2, a signal routed from node 3210 to 3220 can be divided into a plurality of signal portions 3230. One method of dividing a wave division multiplexed signal is to demultiplex the signal prior to transmission. This provides more flexibility for the network since each signal portion can be routed separately and then restored at the receiver node 3220. The signal portions can be routed on a plurality of different channels on a single or multiple communication paths. In one embodiment, each channel can be a carrier wavelength. The communication paths can be paths on a single fiber, paths through common intermediary nodes, paths on different fibers or through different intermediary nodes.

FIG. 2 illustrates the signal divided into four signal portions 3230; however, as understood by one of ordinary skill in the art, the signal can be divided into two or more signal portions. Once the signal has been divided, the divided signal portions 3230 can be transported as different channels. The wavelengths can be transported as part of a group called a virtual super wavelength.

Each channel can be transported on a different communication path 3250, 3252, 3254, and 3256 providing for added flexibility in routing the signals. Consequently, the networking system is not limited to selecting a path capable of transporting the entire signal since the signal is divided into multiple signal portions that can be transported separately. This improves QoS and permits higher bandwidth signal transportation over longer distances.

However, since the signal transported was divided prior to transmission, it must be combined at the destination node 3220 to recreate the transported signal. In order for the original signal to be restored at the destination node 3220, the skew between the channels 3235 should be within a skew constraint. Skew may be defined as a variation relative to the initial timing of a component of a launched data signal or differential latency between the signal portions.

Skew can arise from many different causes depending upon the transmission medium and length over which information is communicated. For example, intrachannel skew and interchannel skew can arise because different wavelength carriers propagate at different rates. In particular, a high frequency carrier signal will generally take a relatively longer period of time to propagate along an identical length fiber as a lower frequency carrier signal. Skew can also arise because the different channels are transported on different paths. The paths may be of varying lengths or have varying numbers of intermediary nodes. Skew becomes an increasingly important consideration when routing signals on different paths because the skew can grow tremendously as a result of varying latencies between the paths.

As shown in FIG. 2, separate communication paths 3250, 3252, 3254, and 3256 are chosen. In the embodiment shown in FIG. 2, four different paths are selected. The networking system of the present invention determines the skew by measuring, predicting, monitoring, or a combination of the above, as further described below. The skew determination provides for flexibility in routing signals since skew can be considered in selecting the communication paths.

Figure 3:
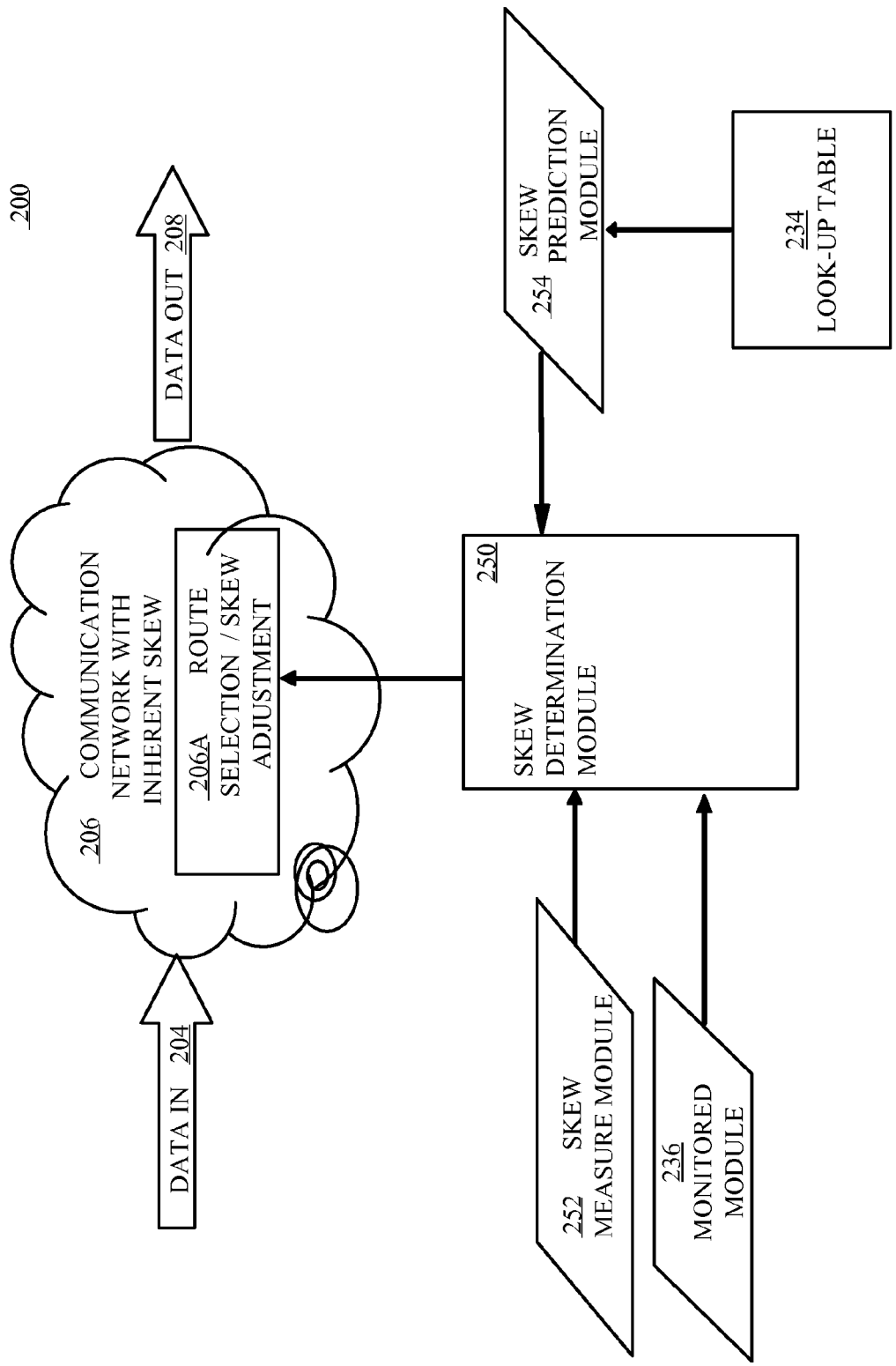
FIG. 3 is a functional block diagram of a communication network that determines skew, in accordance with various aspects of the present invention.

FIG. 3 illustrates a functional block diagram 200 of a communication network that determines skew and routes information across on a network based on the skew in accordance with various aspects of the present invention. Ingress data 204 is provided to communication network 206 as client signals in the data plane 202 and is communicated to another node in the network and exits as client signal egress data 208 in the data plane 202. In a communication network using multiple communication paths to transport a signal as signal portions, skew should be addressed in order to avoid certain types of network failure events such as dropping signals, losing packets caused by overflowing a memory buffer and missing quality of service standards.

Skew determination module 250 determines the skew relative to two or more communication paths on network 206. Skew determination module 250 can receive input from skew measure module 252, from skew predict module 254, or from skew monitor module 236. Skew determination module can also use a combination of input from skew measure module 252, skew predict module 254, and skew monitor module 256.

In some embodiments, skew determination module 250 can also receive input from monitor module 236. Monitor module 236 monitors the skew in the network at a particular interval and provides real-time monitored skew information to skew determination module 250. The monitored skew data may differ from the skew input received from skew measure module 252 and skew predict module 254.

In one embodiment, skew determination module 250 utilizes look-up table 234 to maintain data related to skew. The data related to skew can be stored in the form of latency values associated with each span or multiple spans. By way of demonstration, an exemplary version of look-up table 234 is shown below. One skilled in the art will understand that the table shown is only one example and that the table can be stored in software, hardware, firmware or a combination thereof.

Figure 1:
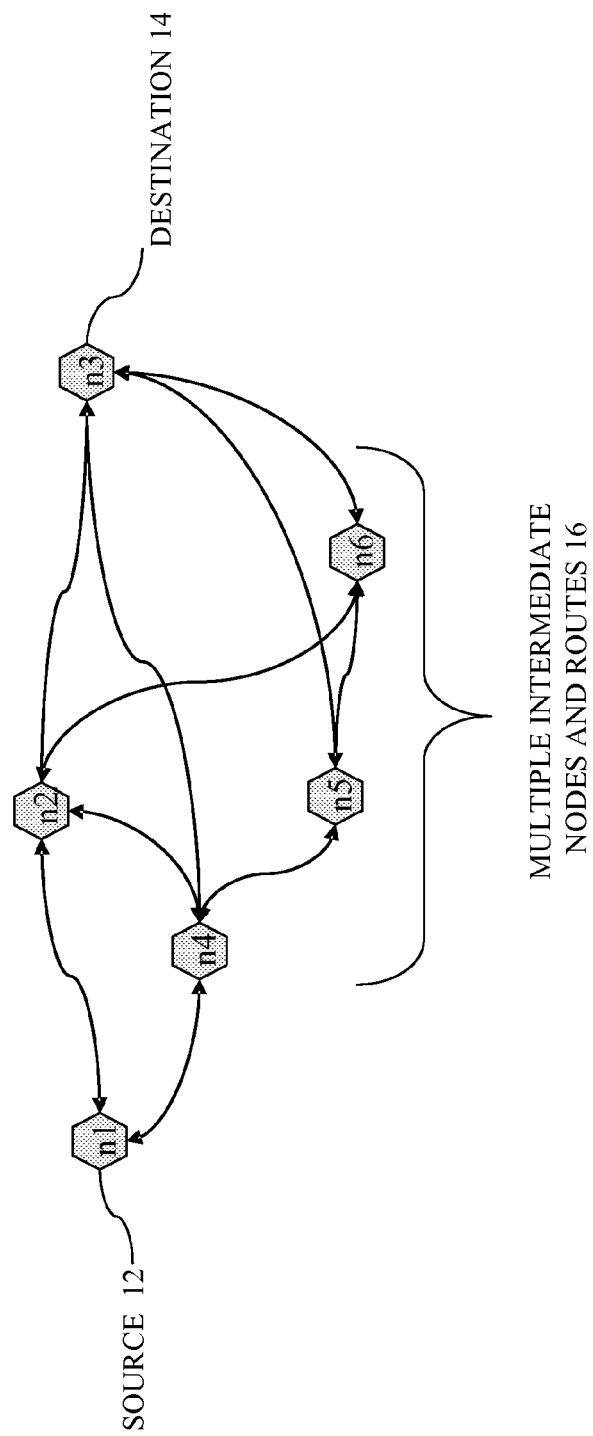
FIG. 1 is a schematic of an optical transport network, in accordance with various aspects of the present invention.

The information contained within look-up table 234 may also be stored in another, non-tabular, format. The table below has two columns: path and latency. The path column includes information related to various different paths within the network system that are available. The path information could be related to a communication between two nodes along a fiber or between two nodes along a fiber with intermediary nodes or systems. The latency column indicates the latency associated with the path in the same row. The present invention, including look-up table 234, could operate in conjunction with a conventional networking system. FIG. 1 is referenced to describe the paths shown in the table below.

| Path | Latency |
| --- | --- |
| n1-n2 | $t_1$ |
| n2-n3 | $t_2$ |
| n1-n4 | $t_3$ |
| n2-n4 | $t_4$ |
| n4-n5 | $t_5$ |
| n5-n6 | $t_6$ |
| n4-n3 | $t_7$ |
| n2-n6 | $t_8$ |
| n5-n3 | $t_9$ |
| n6-n3 | $t_{10}$ |

The exemplary look-up table above illustrates using latency values for each span rather than every path in the network. One skilled in that art will understand the table could be expanded to include latency values associated with additional paths as well as skew data associated with span or path pairs or groupings.

The latency values in the above look-up table can be measured, estimated, or dynamically determined by monitoring the network system, as will be described below with reference to FIGS. 4, 5, 6, 7, and 11.

The above look-up table can be used to determine the skew between any two or more paths on the networking system shown in FIG. 1. For example, to communicate between nodes n1 and n3, there are many available paths some of which are listed and described below:

1) n1 to n2 to n3
2) n1 to n4 to n3
3) n1 to n2 to n6 to n3
4) n1 to n4 to n5 to n3
5) n1 to n2 to n4 to n5 to n3
6) n1 to n2 to n6 to n5 to n3
7) n1 to n4 to n5 to n6 to n3
8) n1 to n4 to n2 to n6 to n3

In one embodiment, the communication between nodes n1 and n3 can be divided into two or more signal portions. Each signal portion can be transported on a different path. For example, one portion can be transported on path number 1 (n1 to n2 to n3) and another portion can be transported on path number 8 (n1 to n4 to n2 to n6 to n3). Skew determination module 250 can use look-up table 234 to determine the latency associated with path number 1 and the latency associated with path number 8 by summing the latencies of the individual spans or by incorporating additional rows in the table shown above to store the latencies for paths with intermediary nodes. For example, the latency for path number 1 ($L_1$) is the sum of $t_1$ and $t_2$ and the latency for path number 8 ($L_8$) is the sum of $t_3$, $t_4$, $t_8$, and $t_{10}$. Additionally, the skew between path number 1 and path number 8 can be determined. Alternatively, look-up table 234 can be expanded to include skew as well as latency. The skew between path number 1 and path number 8 is the absolute value of the difference between $L_1$ and $L_8$.

Skew can also be determined between three or more paths using a similar equation. For example, skew between path numbers 1, 2, and 8 can be similarly calculated. The latency associated with path number 2 ($L_2$) is the sum of $t_3$ and $t_7$. The skew between the three paths is the absolute value of the difference between the greatest and least of the latency values. For example, assuming $L_1 < L_2 < L_8$, then the skew is the absolute value of the difference between $L_1$ and $L_8$. A similar skew determination can be used for skew between four or more paths.

Information relating to skew can be used to select routes or paths for the various signals and signal portions. For example, the skew between paths numbers 1 and 8 can be compared to a skew threshold. If the skew is less than the skew threshold, then the information can be co-routed on paths 1 and 8. If the skew is greater than the skew threshold, then other available paths can be analyzed based on skew using a similar procedure to the one described above. If there are paths that can be selected, then the route selection/skew adjustment module 206A selects the paths that meet the skew constraints. Additionally, each possible path can be examined and the paths with the least skew can be chosen. Furthermore, skew can be included along with a number of other considerations used in selecting an optimal set of paths. The other considerations may be bandwidth considerations, traffic load, Quality of Service, route length, latency, and any other relevant consideration.

One way to determine the skew threshold or skew constraint is to evaluate the amount of skew that can be compensated for or adjusted by the networking system. There are a number of ways to compensate for skew or adjust skew, including, compensating for skew at the transmission node, at the receiver node, or at any or all intermediary nodes. Skew compensation can be achieved in the optical domain using one or more optical buffers, coils of fiber. Skew compensation can also be achieved in the electrical domain using one or more first-in-first-out ("FIFO") buffers. The size of the optical and electrical buffers can be adjusted thus altering the skew constraints.

The modules and functionality shown in the control plane of FIG. 3 can be accomplished centrally within the network, at each node in the network, or a combination thereof. A central network management station can include a controller, or microprocessor, with associated memory, I/O, and other hardware/software to enable the execution of logical instructions on input and output data. The network management station can be a UNIX box, or any other operating system suitable to accomplish the functions mentioned herein. Central network management station is linked to the nodes of the network system.

The present invention is well suited to any coupling arrangement, via any medium, to allow communication between the data and control planes in communication networks. The present invention may only link a portion of the nodes in parallel, which then could subsequently link a coupled series of nodes.

Alternatively, distributed network management architecture could be employed. In particular, at least one node could have connectivity to another node (intranodal) to allow for the communication of resource status in the node for skew adjustment. The present invention is well suited to any form of connectivity that allows for distributed control for skew measurement, communication, status, control, and/or etc. to/from a node, e.g., by optical supervisory channel ("OSC"). A given gateway network element ("GNE") might have connectivity to multiple service network elements ("SNEs").

Alternatively, each node may have standalone skew measurement and correction capacities to simplify the required interaction between the nodes. The present invention is well suited to any combination of these or other control models that allow skew measurement and/or adjustment.

Figure 4:
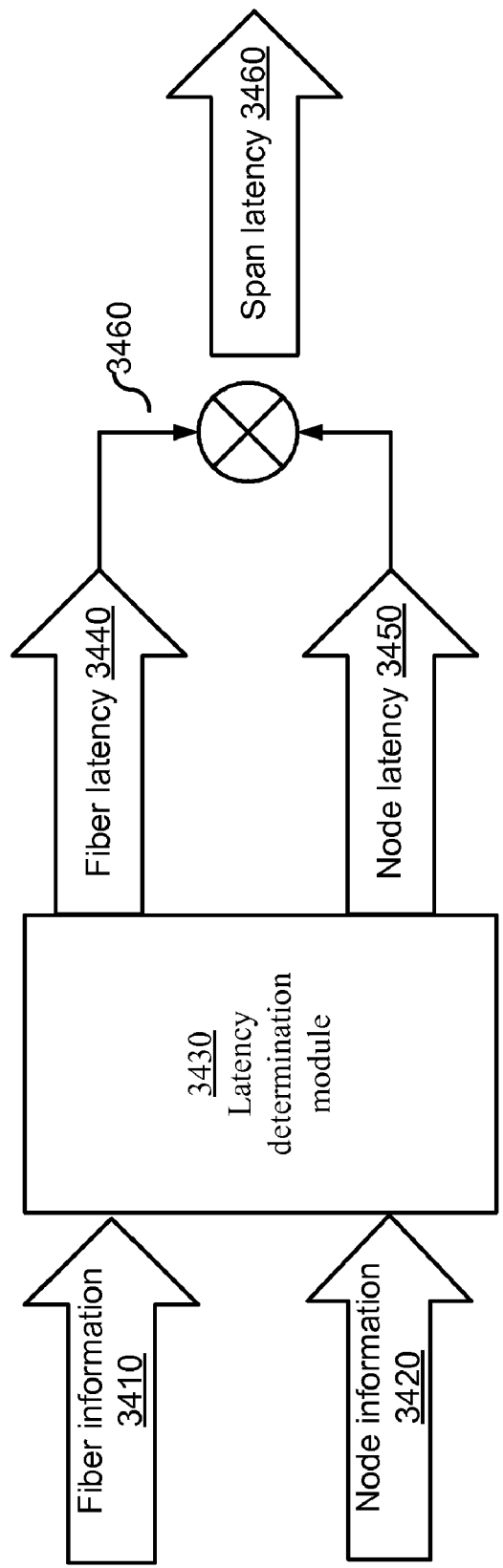
FIG. 4 is a functional block diagram of a system illustrating a priori latency determination.

FIG. 4 is a block diagram further illustrating a priori determination of latency and one implementation of skew predict module 254 in FIG. 3. In the embodiment shown in FIG. 4 latency is predicted in advance of communication on the networking system. The latency differential between two communication paths is used to determine the skew. Since communication paths utilize one or more fibers and nodes and latency information about the fibers, fiber length, and nodes can be known, that information can be used to predict the total span latency. Fiber information 3410 and node information 3420 are inputs into latency determination module 3430. Latency determination module 3430 outputs latency as result of a fiber 3440 and latency as a result of a node 3450. The fiber latencies 3440 and node latencies 3450 are summed at summing junction 3460 to compute the span latency 3470. The fiber information 3410 used by latency determination module 3430 includes properties of the fiber related to the latency that results from transmission along the fiber, for example, the length and dispersion of the fiber. Node information 3420 includes properties of the node related to the latency within a node. Once span latency 3460 is determined, look-up table 234 or other latency reference can be updated to include the predicted latency values 3470.

Figure 5:
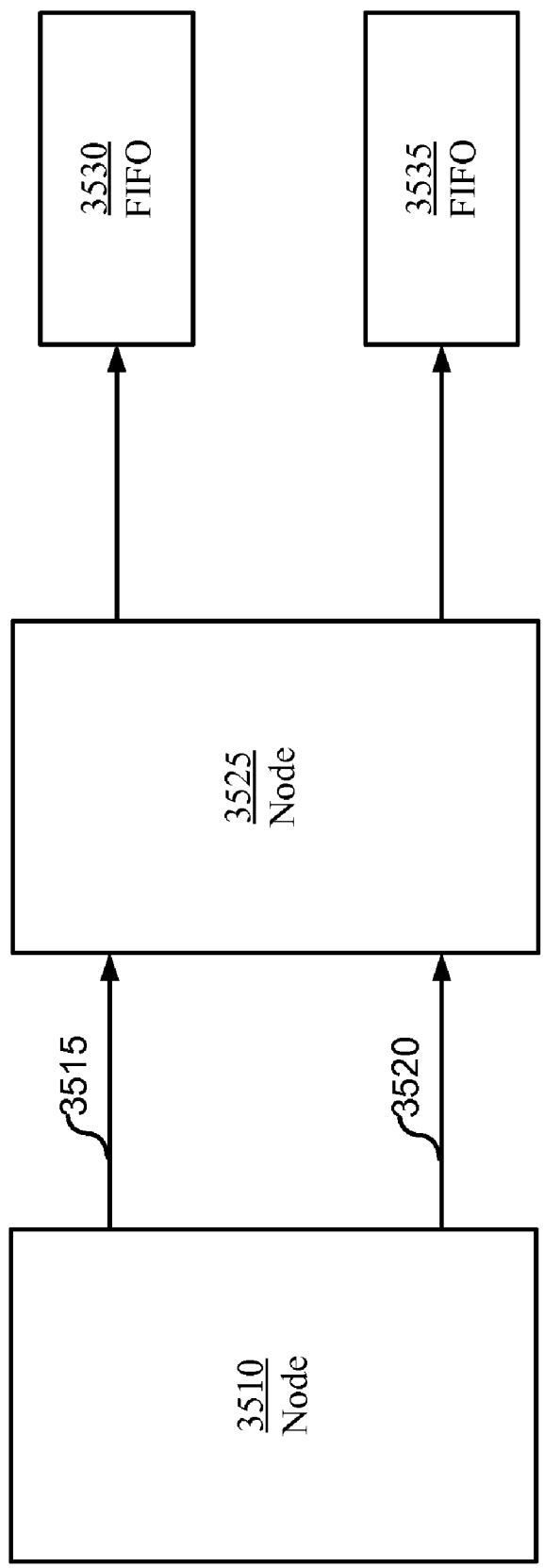
FIG. 5 is a functional block diagram of a system illustrating empirical latency determination, in accordance with various aspects of the present invention.

Another way to determine latency, and therefore skew, is to determine it empirically by measuring the skew between two paths. Skew can be determined empirically prior to setting up a communication path. FIG. 5 is a block diagram illustrating an empirical determination of latency across a span. Referring to FIG. 5 a network span is shown between transmission node 3510 and receiver node 3525. In the embodiment shown in FIG. 5 the signal is divided into two portions 3515 and 3520 for communication. A timing marker is included as part of each signal. The marker is a preset bit pattern that will be used by a receiver node 3525 to match the same pattern in a test signal, whose arrival time will then be evaluated. The marker should be sufficiently unique, such as a pseudo-random binary sequence ("PRBS"), that it is not confused with a data signal. The marker may be a stand-alone signal(s) or may be inserted into a client signal running live traffic.

When the signal is received at receiver node 3525 a set of first-in-first-out ("FIFO") buffers 3530 and 3535 can be used to store the signal, including the timing marker. The time difference between the timing markers indicates the skew between the two communication paths shown in FIG. 5. One skilled in the art will recognize that the above empirical skew determination can be used with two or more two communication paths.

In one embodiment, both measured and predicted skew determinations may be employed. Look-up table 234 may be created and/or updated based on theoretical skew data, empirical skew data, or a combination thereof. Monitor module 236 determines monitored skew data by repeating the empirical skew determination described above at regular intervals. Monitored skew data can be used to dynamically update look-up table 234.

Figure 6:
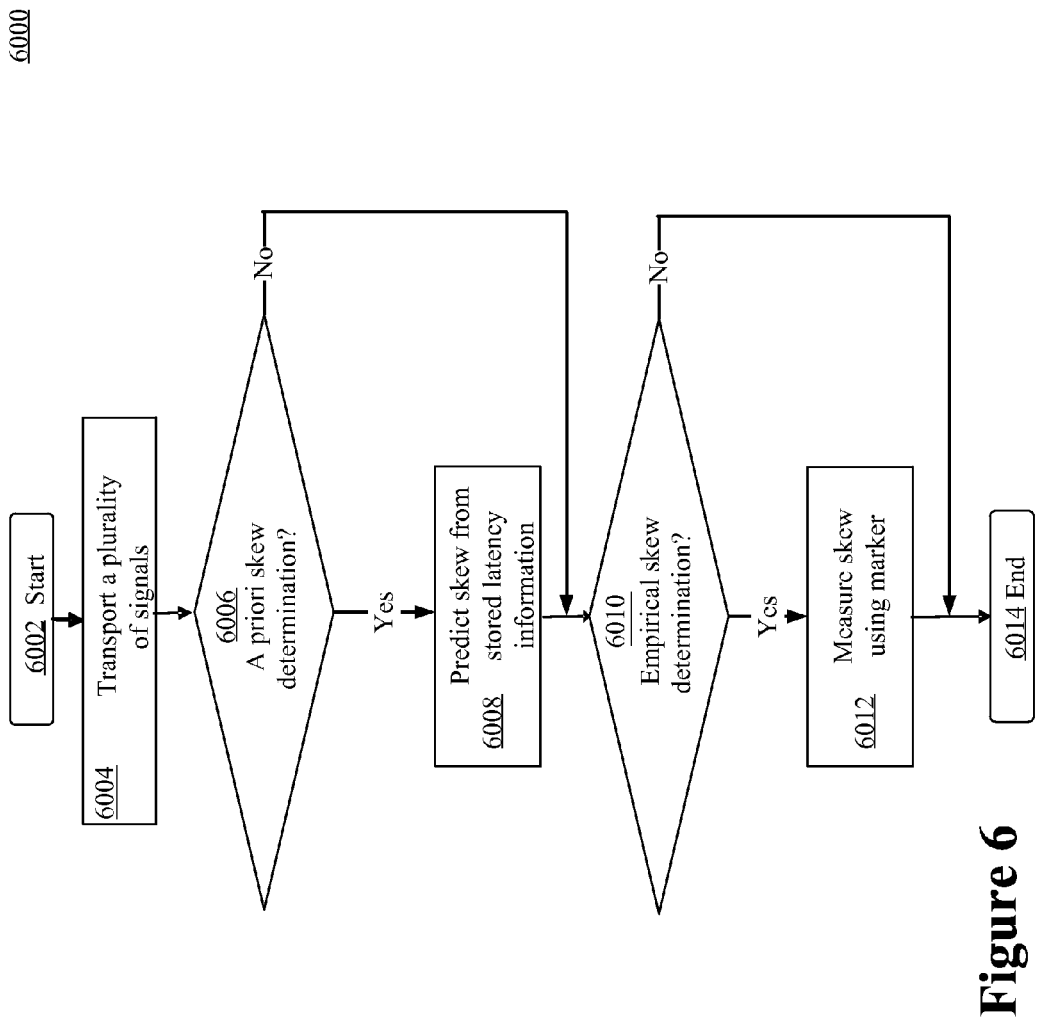
FIG. 6 is a flowchart of a process to determine the skew of information transmitted by multiple communication paths in a communication network, in accordance with various aspects of the present invention.

The flowchart in FIG. 6 describes a method, independent of structure, which may be implemented in various embodiments of the invention. FIG. 6 is a flowchart 6000 of a process to determine skew relative to a plurality of communication paths in a communication network in accordance with various aspects of the present invention. A plurality of signals are transported 6004. If skew is determined a priori 6006, then skew is predicted from stored latency information in step 6008, as described above. If not, and if skew is determined empirically 6010, then skew is measured using a synchronization marker 6012, as described above. If skew is not determined empirically 6010, then the process ends 6014. As shown in FIG. 6, skew may be determined a priori 6008 or empirically 6010 or a combination thereof.

Figure 7:
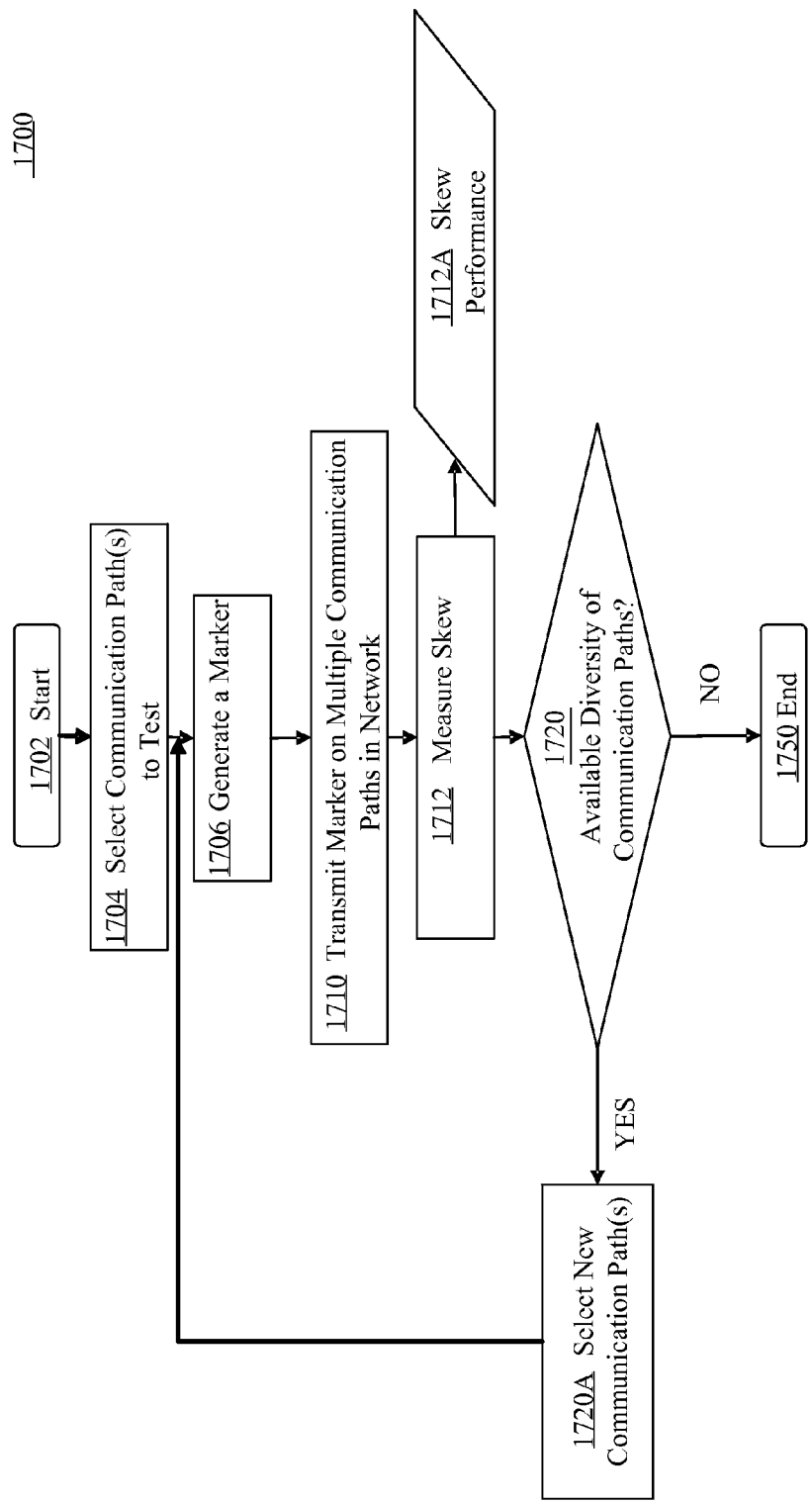
FIG. 7 is a flowchart of a process to empirically measure the skew of information transmitted by multiple communication paths in a communication network, in accordance with various aspects of the present invention.

The flowchart in FIG. 7 describes a method, independent of structure, which may be implemented in various embodiments of the invention. In various embodiments of the invention, associated data from a client signal is distributed and routed by different physical routing (nodes and fibers), different wavelength groupings, different wavelengths and/or Optical Carrier Groups ("OCGs"), and with different skew adjustments. The specific communication paths provided therein are an exemplary allocation of routing and skew adjustments by a controller that evaluated system skew performance and resources.

FIG. 7 is a flowchart 1700 of a process to empirically measure the skew of information transmitted by multiple paths in a communication network in accordance with various aspects of the present invention. Measuring the skew of a given path can occur prior to establishing a circuit for a given client signal to provide more reliability in the quality of the signal as it is transported through a network.

A communication path(s) is selected 1704 in order to test skew properties thereof. Communication paths may be defined as having various lengths with differing number of intermediary nodes including, but not limited to, span-wise evaluation, route-wise evaluation (e.g., from source node to destination node), or round-trip-wise and then back to original source node).

A marker is generated 1706 for transmission on the chosen communication path(s). The marker is transmitted 1710 on multiple communication paths in the network. The communication paths can be tested in a parallel fashion, such that relative skew between two communication paths may be measured, or tested in series with synchronization and timing comparisons made by comparison to an accurate reference clock. The transmission of the test signal with marker can be performed either while the entire network is down, or while the network is communicating traffic on channels other than the channels, or communication paths, to be tested.

The skew is measured 1712 and output as 1712A skew performance and communicated to either local nodes or to centralized controller. Skew data can be stored as a new variable, or object, in the Link Stated Advisory ("LSA") table, for consideration in choosing a communication path in the network.

If diversity of communication paths exists 1720, in terms of carrier wavelengths, OCG groups, physical routing on nodes or fibers, etc., then in step 1720A, a new route is selected and is evaluated using the marker at step 1706 onward. In this manner, the combinations and permutations of communication paths available in the communication network can be tested and evaluated for future use. The test process 1700 can be repeated at timely intervals, such as programmed maintenance ("PM"), existing downtime, or as interleaved with revenue traffic on the network, as resources permit, especially during low traffic periods. If an update provides a substantial change in the skew performance, notices or interrupt signals may be generated and forwarded to appropriate users, controllers, for remedial management of the network. In one embodiment, the networking system not only determines the skew, but can also compensate for the skew.

Figure 8:
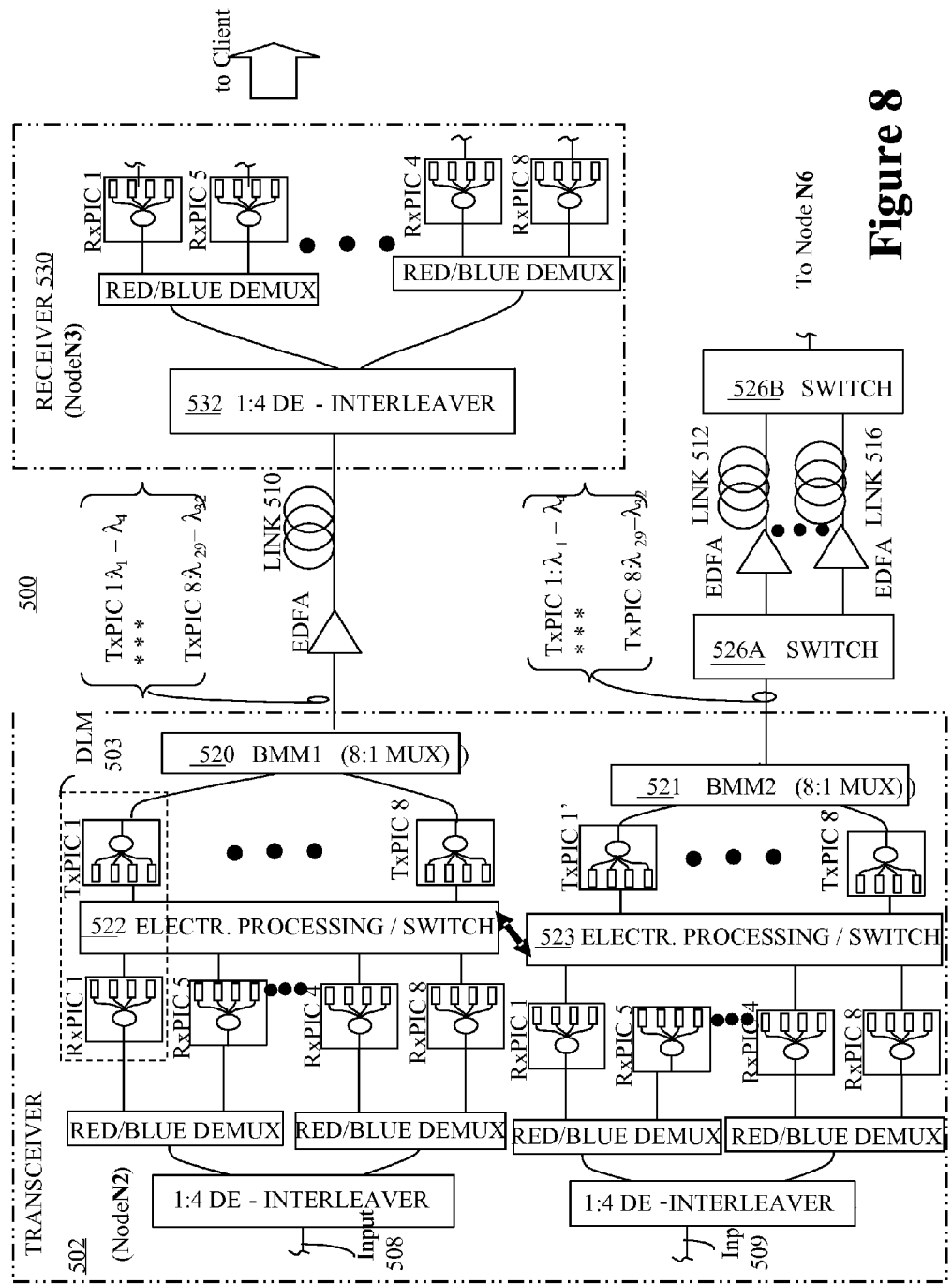
FIG. 8 is a schematic of a transceiver node with its internally coupled and switched band modules each coupled to different nodes for space diversity routing, in accordance with various aspects of the present invention.
Figure 9:
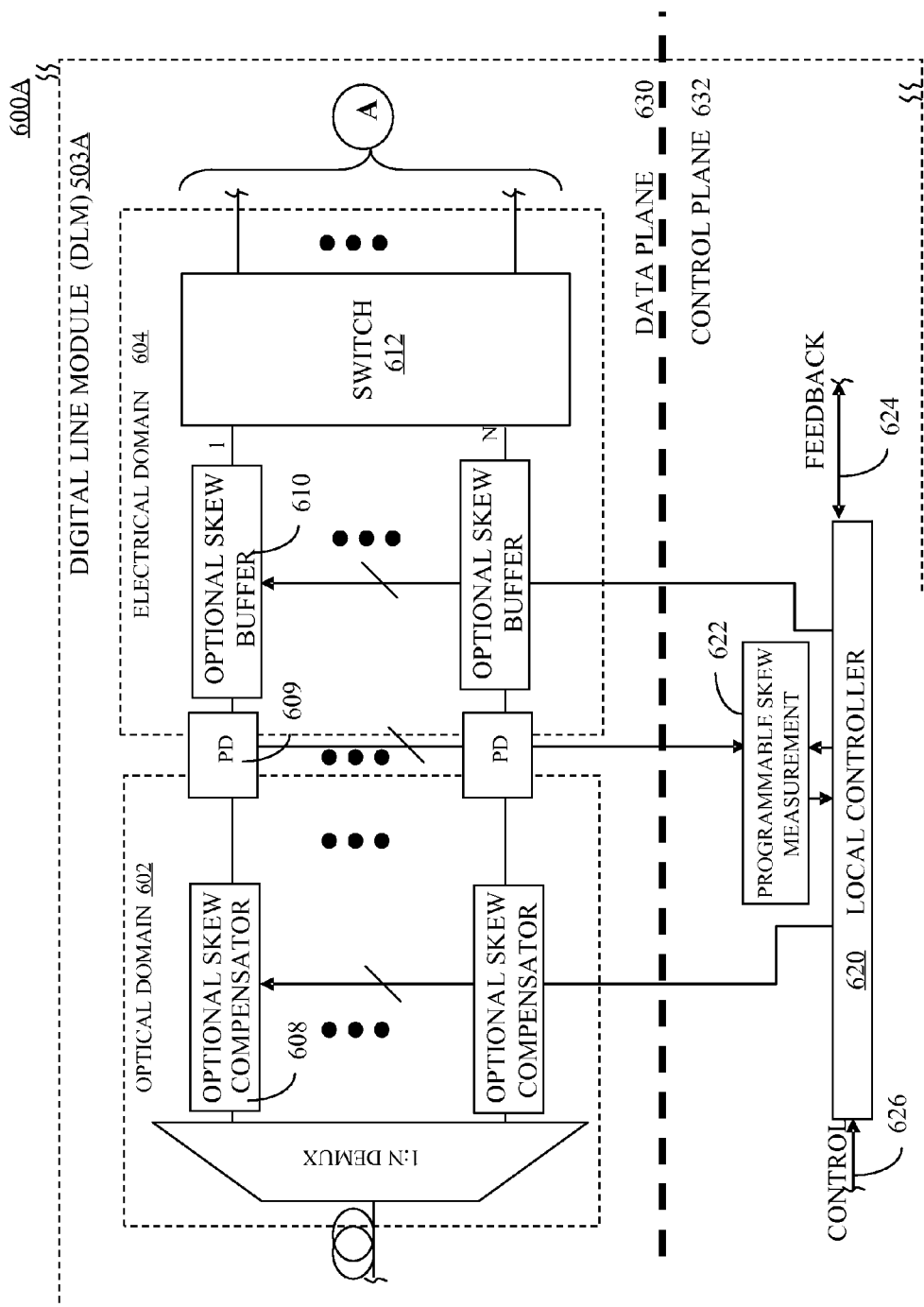
FIG. 9 is a schematic of a receiver portion of a line module wherein the receiver has optical skew compensation with electronic skew measurement and buffer, in accordance with various aspects of the present invention.
Figure 10:
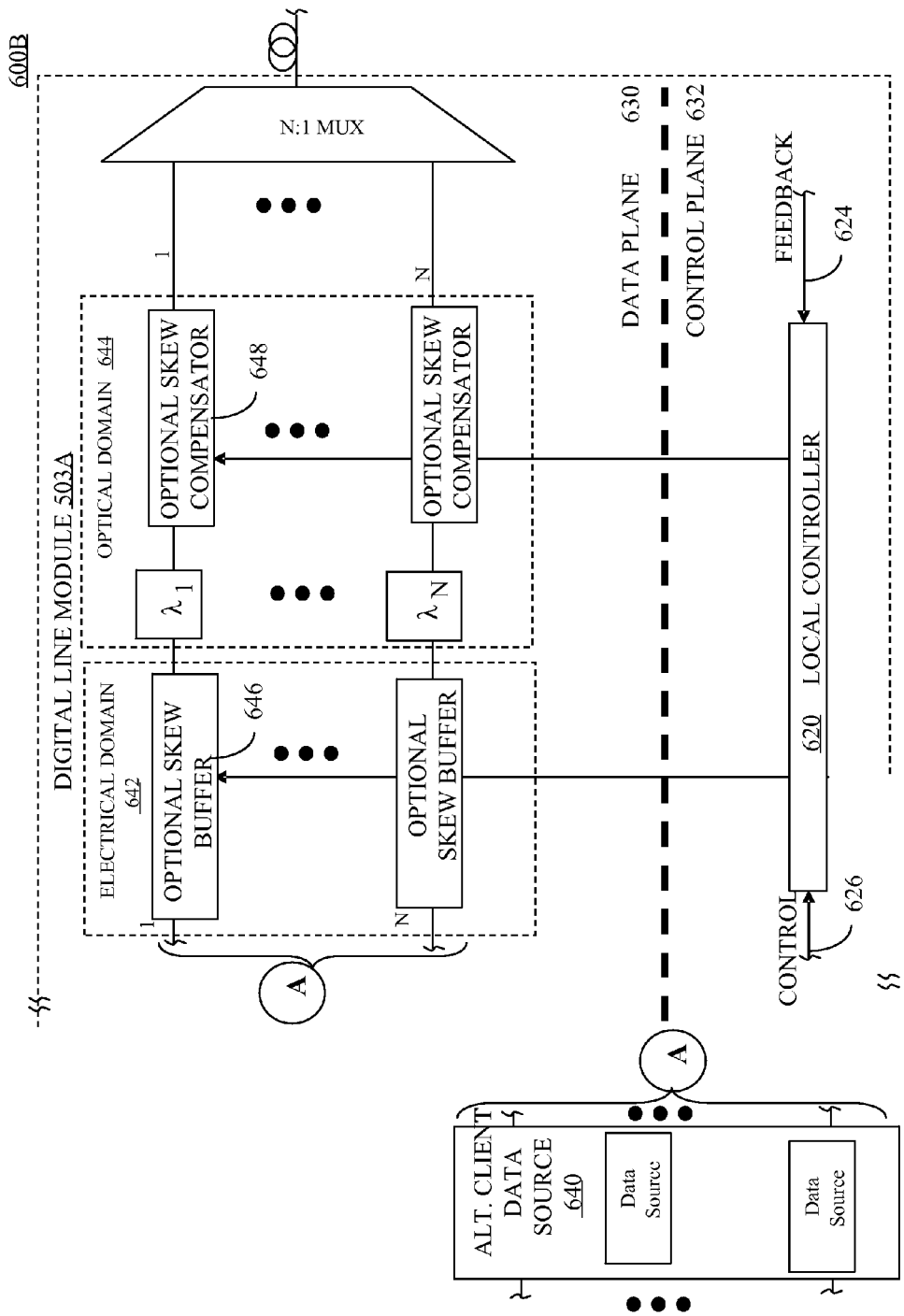
FIG. 10 is a schematic of a transmitter portion of a line module wherein the transmitter has optical skew compensation and electronic skew measurement and buffer, in accordance with various aspects of the present invention.

In FIGS. 8-10, a novel switching function in a node of a network is illustrated in accordance with various aspects of the present invention. The switching function allows rerouting of a portion of information, such as a portion of a client signal, on a different wavelength, different fiber, and/or to a different node. Rerouting can be managed so as to provide for skew adjustment in order to provide better quality of service of the overall information transmitted over the network.

FIGS. 8-10 also illustrate an apparatus for implementing the skew adjustment within an exemplary node that also employs optical to electrical to optical ("OEO") conversion. Once in the electrical domain, client signals enjoy the benefits of digital signal processing, switching (channel and band allocation), and signal regeneration that correspond to electronically implemented functions. However, the present invention is also well suited to performing functions off frequency translation/conversion for purposes of rerouting in the optical domain, e.g. using a PIC, PLC, or discrete electro-optical and optical devices. For example, a nonlinear process in semiconductor optical amplifiers ("SOAs") or a highly nonlinear fiber could be utilized to satisfy frequency translation/conversion needs. Additional detail on the design, function and architecture of the TxPIC, RxPIC and DON can be found in U.S. patent application Ser. Nos. 10/267,331, 10/267,212, and U.S. Pat. No. 7,116,851, all of which are incorporated by reference in their entirety.

Referring in particular to FIG. 8, system 500 includes a transceiver node 502 coupled to receiver 530 and coupled to Node N6 (not shown) via switches 526A and 526B in accordance with various aspects of the present invention. Transceiver node 502 is coupled to one or more multiplexing modules, such as band multiplex modules ("BMM"), each coupled to different nodes for space diversity routing. Transceiver node 502 has a portion of communication paths from the WDM signal outputs from TxPIC1 through TxPIC8 coupled via BMM1 520 and fiber link 510 to a downstream receiver 530 and its BMM 532.

Transceiver node 502 is a multi-channel device with multiple DLM 503 modules each of which contain an RxPIC and a TxPIC, a group of which are coupled into a band MUX module ("BMM") that multiplexes the range of wavelengths (e.g., TxPIC1 $\lambda_1$ through TxPIC8 $\lambda_{32}$) into a WDM signal for transmission on fiber link 510 to a downstream node. Inputs 508 and 509 are coupled from upstream nodes in the communication network. Within each DLM, electronic processing and switching blocks 522 and 523 provide options to manage the transmitted information in the electrical digital domain, including skew management functions, described in more detail in subsequent figures. While all the wavelengths processed by transceiver 502 may be within in the C-band, this band may be divided between a red portion of the C-band, to represent lower wavelengths in the signal spectrum, and the blue portion of the C-band, to represent higher wavelengths in the signal spectrum. While the present embodiment constrains the spectrum of wavelengths for transmission within the C-band, the present invention is well-suited to using any combination and location of wavelengths such as utilizing multiple bands, e.g., L-band, S-band, any other band or to utilizing divisions within a band, for communication path diversity.

In certain embodiments, two nodes may be coupled via multiple fibers that can be selected for their different skew properties, such as their different dispersion properties between channels that will allow carriers at different wavelengths to arrive at a downstream node at different times. Transceiver node 502 has BMM2 521 coupled to node N3 via switch 526A and 526B on either end of the multiple links 512 through 516. Switches 526A and 526B are any switch, that functions to couple one of the multiple fibers to each node, such as by an external 1×N mechanical switch, thermo-optic optical switch, or micro-electrical-mechanical ("MEMs") switch.

Referring now to FIGS. 9 and 10, a more detailed illustration of an exemplary transceiver digital line module ("DLM") 503A is presented in two parts, with FIG. 9 illustrating a receiver portion of the DLM, and FIG. 10 illustrating a transmitter portion of the DLM. DLM 503A in FIGS. 9 and 10 correspond to DLM 503 block portion of the transceiver 502 shown in FIG. 8. Output A from receiver portion of DLM is received as input A at the transmitter portion of DLM.

Referring specifically to FIG. 9, a schematic of a receiver portion 600A of a digital line module 503A is shown wherein the receiver has optical skew compensation, with electronic skew measurement and skew buffer in accordance with various aspects of the present invention. Receiver portion of DLM 503A has an optical domain 602 with customary components such as 1:N DEMUX and an array of photodetectors (PDs) for $\lambda_1$ to $\lambda_N$.

Certain embodiments provide coupling from the photodetectors to a programmable skew measurement device 622. The skew measurement device is enabled to capture skew measurements via a comparator (e.g., a differential sense amplifier, and other digital signal processing techniques) that correlates the output from a photodetector with a predetermined bit pattern. The bit pattern is replicated in a marker of a test signal transmitted to the DLM 503A during a learning mode for the network. This skew testing process is also referenced in process 1700 of FIG. 7. Skew measurement device 622 has multiple instances of correlation ability along with a local clock input for measuring the difference in time from receipt of the marker for each of the multiple channels $\lambda_1$ to $\lambda_N$. Alternatively, programmable skew measurement device 622 may include the capability to perform a relative comparison measurement between any two wavelengths at a given time for comparison testing. This pattern can be repeated for different wavelengths, as directed by local controller 620, in combination with a central network controller.

Local controller 620 is coupled to skew measurement device 622, in the control plane 632, to provide initiation signals for test mode, selection of wavelengths to measure, and reception of skew data. Local controller 620 in the current node is coupled via a unidirectional or bidirectional line 624 to other nodes in the network to share skew data measurements, skew resource status, skew needs, and skew resource allocation.

Besides providing skew measurement control, various nodes in these embodiments of the invention provide an optional skew compensator 608 for each channel in the optical domain 602 of the node and optional skew compensator 610 in the electrical domain 604. Skew buffer 608 may be any optical device with delay properties, such as a ring resonator. In various embodiments, an optional skew compensator is provided for only a portion of the signal channels in the DLM 503A, such as on channels on which signals propagate at a higher rate per unit time, such as those on lower frequency channels. In other embodiments, optional skew compensator has a bypass that is enabled via local controller 620 if no skew adjustment is needed. Lastly, in another embodiment, no optical skew compensation is used because of higher cost, and sufficient capability of skew adjustment via routing, and/or buffering in the electrical domain.

Similar to optical skew buffer 608, optional electronic skew compensator 610 may be any buffer medium, such as a first-in-first-out ("FIFO") memory buffer, which delays the information on the given channel. In different embodiments, optional electronic skew compensator 610 can be implemented on all channels, or only on a fraction of the channels. Optional optical skew compensator 608 can be programmable to allow a variable amount of delay on the information transmitted thereon, with a bypass to reduce any incidental propagation delay that the device may exhibit even if no skew compensation is desired. Additionally, optional electronic skew compensator 610 may be located anywhere within the optical networking system, including at transmitting nodes, receiving nodes and intermediary nodes. After the appropriate buffering in the receiver, the electrical signals are communicated to switch 612, which can be any form of switch, such as cross-point switch, which enables rerouting of information signals from one channel, or wavelength, to another channel, or wavelength.

Referring specifically to FIG. 10, a schematic of a transmitter portion of a line module 600B is shown wherein the transmitter has optical skew compensation and electronic skew buffer in accordance with various aspects of the present invention. Transmitter receives the electrical signals 'A' from the receiver of FIG. 9 or alternatively from a client data source 640, such as an add channel. Transmitter portion of DLM 503A also has electrical domain portion 642 and optical domain portion 644, with respective optional optical skew buffer 646, and optional electronic skew compensator 648. DLM 503A can utilize any combination of these delay devices in the transmitter and receiver as is applicable for a given design or application depending on the level of skew variation exhibited in the network. Optional buffers for FIGS. 9 and 10 are dedicated, distributed in-line buffers in the present embodiment. However, in-line buffers can also be a centralized, shared memory buffer, albeit with latency, cost, and flexibility tradeoffs.

Various embodiments of the invention may be applied to submarine optical systems, some of which may be used as trans-oceanic optical networks that connect terrestrial systems across a large body of water. One skilled in the art will recognize that the length in which an optical signal travels on these trans-oceanic systems presents diverse engineering issues including both dispersion and skew compensation. These issues are further complicated as the data rate of a client signal increases and the total number of channels on which a signal is transmitted expands.

Figure 11:
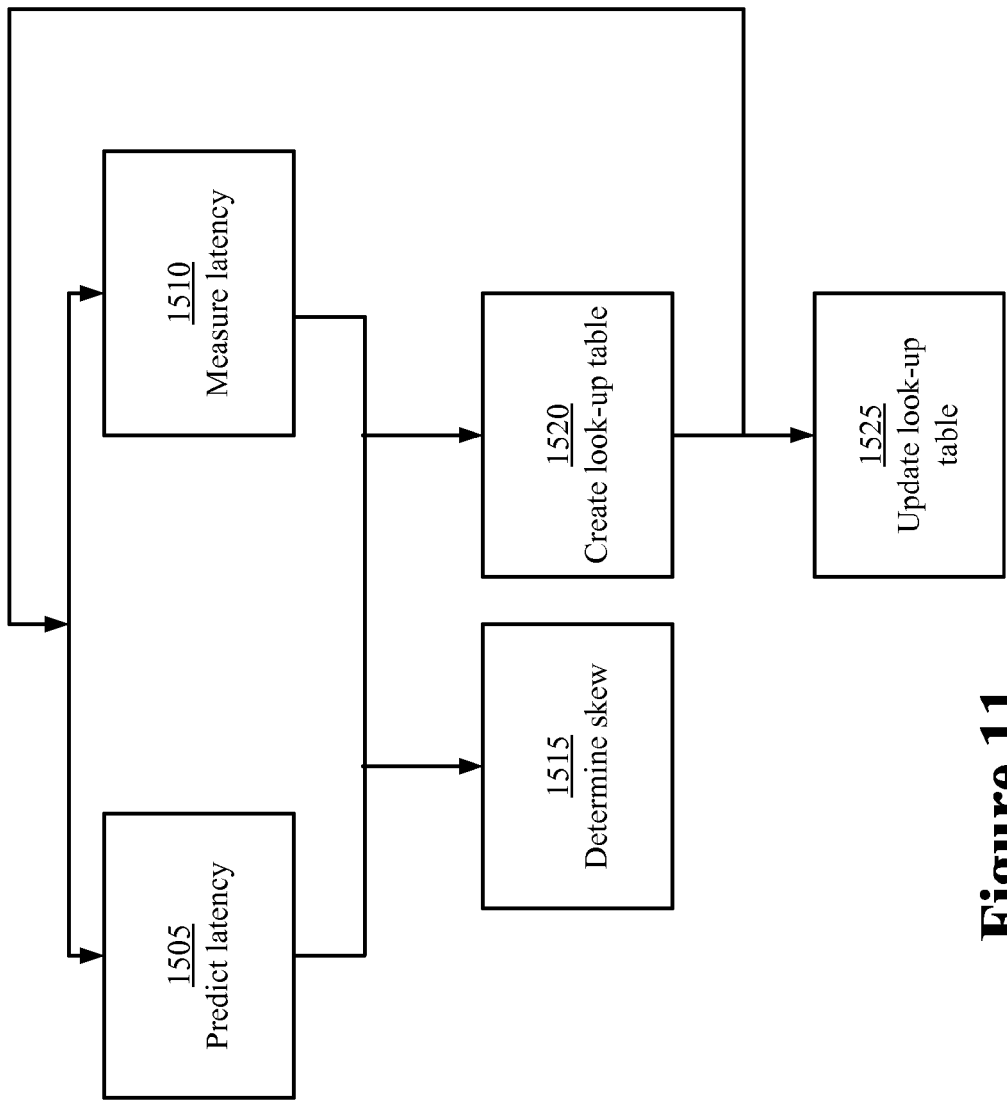
FIG. 11 is a flow chart illustrating creation and maintenance of latency look-up table.

FIG. 11 is a flowchart illustrating processes, independent of structure for creating and updating look-up table 234. Referring to FIG. 11, latency can be predicted 1505, latency can be measured 1510 or a combination thereof, as described above in reference to FIG. 3. The latency can be used to determine skew 1515 as described above in reference to FIG. 3. Also, the latency values can be used to create a look-up table 1520 or can be stored in another format. Once the table has been created 1520, the latency values can be measured 1510 and the table updated real time 1525. The table can be updated 1525 before there is network traffic, while there is network traffic, or after network traffic.

One skilled in the art will recognize that the above-described method for calculating latency across diverse paths may be applied to any number of paths greater than two. Additionally, the method may be applied to any type of network including, but not limited to, submarine, trans-oceanic optical systems.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

We claim:

1. A networking system for determining skew relative to a plurality of communication paths, the system comprising:
a transmission node that transmits a signal;
a first path that transports a first portion of a signal;
a second path that transports a second portion of the signal;
a skew determination module, coupled within the networking system, that determines the skew relative to the first communication path and the second communication path;
a receiver node that receives the first and second portions of the signal; and
a controller
wherein the controller predicts the skew by calculating the skew based on a latency associated with the first path and latency associated with the second path, and the latency associated with the first and second paths is determined by calculating a time difference between a marker transmitted in the first portion of the signal and the marker transmitted in the second portion of the signal.

2. The networking system of claim 1 wherein the latency associated with the first and second paths is calculated based on characteristics of the networking system.

3. The networking system of claim 1 wherein the latency associated with the first path and latency associated with the second path are stored in a look-up table.

4. The networking system of claim 1 wherein the skew determination module measures the skew between the first communication path and the second communication path.

5. The networking system of claim 4 wherein the skew is measured by measuring latency associated with the first communication path and latency associated with the second communication path.

6. The networking system of claim 1 wherein the skew determination module predicts the skew between the first communication path and the second communication path and measures the skew between the first communication path and the second communication path.

* * * * *